(12) United States Patent
Allison, III (10) Patent No.: US 7,132,934 B2
(45) Date of Patent: Nov. 7, 2006

(54) IGNITION SAFETY DEVICE AND METHOD THEREFOR

(76) Inventor: Robert D Allison, III, 5783 Hickam Ave., Las Vegas, NV (US) 89130

( * ) Notice: Subject to any disclaimer, the term of this patent is extended or adjusted under 35 U.S.C. 154(b) by 467 days.

(21) Appl. No.: 10/810,434

(22) Filed: Mar. 26, 2004

(65) Prior Publication Data
US 2005/0212668 A1 Sep. 29, 2005

(51) Int. Cl.
*B60Q 1/00* (2006.01)
(52) U.S. Cl. ............... 340/438; 340/457.1; 307/10.6
(58) Field of Classification Search .......... 340/438, 340/425.5, 457, 457.1; 307/10.1, 10.3, 10.6
See application file for complete search history.

(56) References Cited

U.S. PATENT DOCUMENTS

| | | | |
|---|---|---|---|
| 3,831,140 A | 8/1974 | Anderson, Jr. et al. | |
| 3,859,627 A | 1/1975 | Quantz | |
| 3,860,904 A | 1/1975 | Andersen | |
| 3,864,668 A | 2/1975 | Bickford | |
| 3,883,751 A | 5/1975 | Salway | |
| 3,883,843 A | 5/1975 | Telmet et al. | |
| 3,898,473 A | 8/1975 | Ueda et al. | |
| 3,898,475 A | 8/1975 | Mogi | |
| 3,902,074 A | 8/1975 | Uota | |
| 3,934,671 A | 1/1976 | Hart | |
| RE28,804 E | 5/1976 | Sardo, Jr. | |
| 4,107,645 A | 8/1978 | Lewis et al. | |
| 4,313,519 A | 2/1982 | Lipschutz | |
| 4,479,064 A * | 10/1984 | Monsen | 290/37 R |
| 4,516,121 A * | 5/1985 | Moriyama et al. | 370/224 |
| 4,581,504 A * | 4/1986 | Hamel, Sr. | 200/61.08 |
| 4,747,616 A * | 5/1988 | Burris | 280/807 |
| 4,785,906 A | 11/1988 | Kang | |
| 4,922,769 A * | 5/1990 | Tury | 477/125 |
| 5,081,586 A * | 1/1992 | Barthel et al. | 701/49 |
| 5,133,425 A | 7/1992 | Han | |
| 6,498,562 B1 * | 12/2002 | Yano | 340/457.1 |
| 6,501,374 B1 * | 12/2002 | King et al. | 340/457.1 |
| 6,629,050 B1 | 9/2003 | Modgil | |
| 6,900,555 B1 * | 5/2005 | Sakamoto et al. | 307/10.1 |
| 2003/0098194 A1 | 5/2003 | Roddy | |

* cited by examiner

Primary Examiner—John Tweel, Jr.
(74) Attorney, Agent, or Firm—Harry M. Weiss; Veronica-Adele Cao; Weiss & Moy, P.C.

(57) ABSTRACT

An ignition safety system and method. A control circuit is coupled to a warning circuit indicating a safety condition. The control circuit is further coupled to a fuse circuit to control an operation of a motor ignition circuit in response to the safety condition.

27 Claims, 6 Drawing Sheets

IGNITION SAFETY DEVICE AND METHOD THEREFOR

FIELD OF THE INVENTION

This invention relates generally to ignition safety system, and more particularly to a safety system coupled to a fuse housing to control an ignition circuit.

DESCRIPTION OF THE RELATED ART

Devices having motors, such as cars, motorcycles, lawnmowers, and chainsaws can be dangerous to operate. Often such motored devices have built-in mechanisms to provide a warning if an unsafe condition exists. For example, automobiles feature indicators that display to a driver if a seatbelt is unfastened or a door is ajar. However, these mechanisms for detecting unsafe conditions often only result in a warning being indicated, leaving the user the option to continue operating the motor device in unsafe conditions.

Unfortunately, seatbelt warnings are often ignored, with potentially fatal consequences in the event of a collision. Drivers and passengers continue to refuse to wear seatbelts, in spite of well-established evidence that seatbelts prevent or reduce injury and the adoption of laws requiring the use of a seatbelt when driving.

Several attempts have been made to solve this problem by preventing a car from starting when seatbelts are not properly fastened. Many of these efforts rely on automobile manufacturers to voluntarily develop, manufacture, and sell the systems and further rely on consumers to be willing to pay potentially higher prices for a car that won't start if the seatbelts are not fastened.

Other attempts to solve this problem involve aftermarket devices that require complex professional installations. Such aftermarket devices and installations are often expensive and require altering original wiring for the device to function correctly.

A need therefore exists to provide an aftermarket safety device that can be manufactured inexpensively and easily installed by an owner without requiring electrical tools or skills.

The present invention satisfies these needs, and provides other, related, advantages.

SUMMARY OF THE INVENTION

The foregoing objectives are achieved in the ignition safety system and method therefor.

In accordance with one embodiment of the present invention, an ignition safety system is disclosed. It comprises, in combination: a fuse circuit; an ignition circuit coupled to the fuse circuit for starting a motor; a warning circuit for indicating a safety condition; and a control circuit coupled to the warning circuit and the fuse circuit for controlling an operation of the ignition circuit.

In accordance with another embodiment of the present invention, an ignition safety system is disclosed. It comprises, in combination: a fuse circuit comprising a fuse housing; an ignition circuit for starting a motor of a vehicle, the ignition circuit being coupled to the fuse circuit; a warning circuit for indicating a seatbelt condition; and a control circuit comprising an electrical connector, the electrical connector being dimensioned to engage the fuse housing for coupling the control circuit to the fuse circuit, the control circuit being further coupled to the warning circuit, for controlling an operation of the ignition circuit in conformity with the seatbelt condition.

In accordance with another embodiment of the present invention, an ignition safety system is disclosed. It comprises, in combination: seatbelt indication means for indicating a seatbelt condition; an electrical connector dimensioned to couple to a fuse housing of an ignition circuit; and a switch coupled to the electrical connector and to the seatbelt indication means for enabling and disabling the ignition circuit in conformity with the seatbelt condition.

In accordance with another embodiment of the present invention, a safety method is disclosed. It comprises the steps of: providing a fuse circuit for disabling an ignition circuit of a motor at a predetermined electrical current; providing a warning circuit for indicating a safety condition; providing a control circuit; coupling the control circuit to the warning circuit; coupling the control circuit to the fuse circuit; detecting the safety condition; and controlling an operation of the ignition circuit.

The foregoing and other objects, features, and advantages of the invention will be apparent from the following, more particular description of the preferred embodiment of the invention, as illustrated in the accompanying drawings.

DESCRIPTION OF EMBODIMENTS OF THE INVENTION

Figure 1:
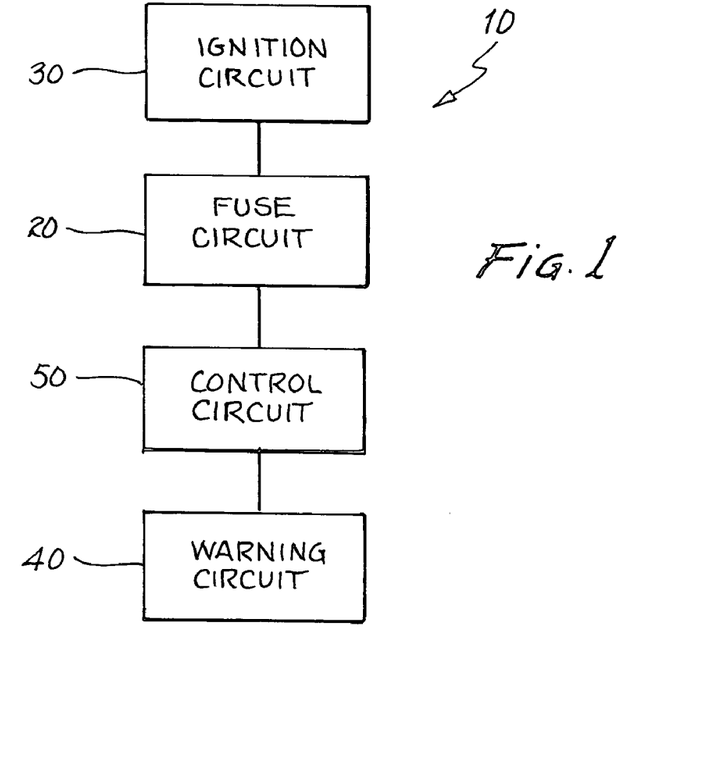
FIG. 1 is a block drawing of the components of an ignition safety system in accordance with a preferred embodiment of the present invention.

With reference now to the figures, and in particular FIG. 1, an ignition safety device 10 is shown. The ignition safety device 10 comprises, in combination, a fuse circuit 20, an ignition circuit 30 coupled to the fuse circuit 20 for starting a motor 32, a warning circuit 40 for indicating a safety condition, and a control circuit 50 coupled to both the warning circuit 40 and the fuse circuit 20 for controlling an operation of the ignition circuit 30.

Figure 2:
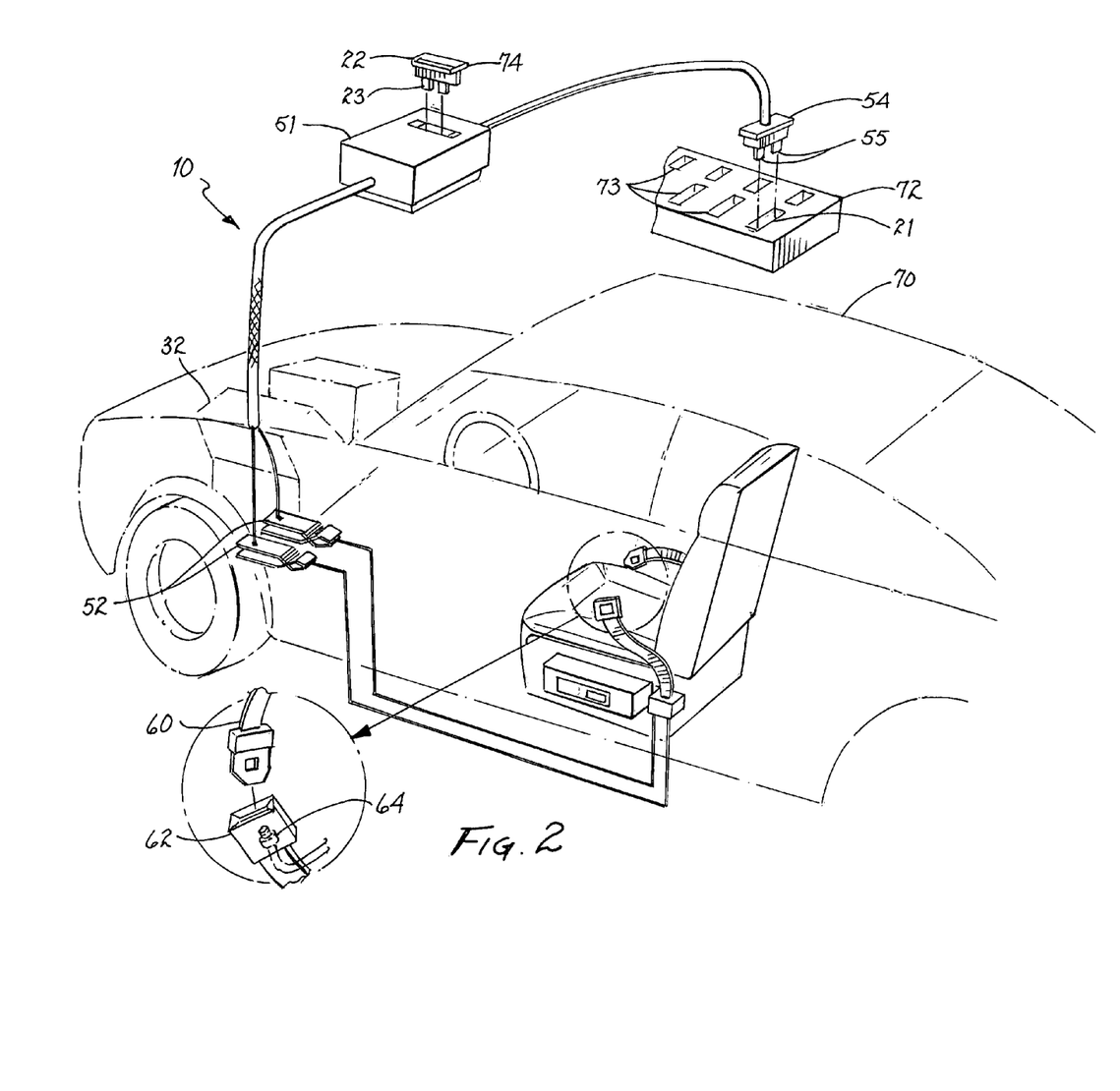
FIG. 2 is a perspective illustration depicting an ignition safety system for detecting a condition of a seatbelt in a motor vehicle in accordance with a preferred embodiment of the present invention.

Referring now to FIG. 2, in accordance with a preferred embodiment of the present invention, the ignition safety device 10 comprises a seatbelt 60, with the safety condition comprising a condition of the seatbelt 60. The safety device 10 further comprises a vehicle 70, and the motor 32 provides power for the vehicle 70. Although the ignition safety device 10 comprises a seatbelt 60 and the safety condition comprises a condition of the seatbelt 60, it is within the spirit and scope of the present invention that the safety device 10 not comprise a seatbelt so long as an operation of the ignition circuit 30 is controlled in conformity with a safety condition. For example, the safety device 10 may comprise a lawnmower, and the safety condition may be an activated pressure switch for indicating whether a user of the lawnmower is in control of the mower. As another example, the safety device 10 may comprise an airplane, and the safety condition may comprise whether gust locks immobilizing the control surfaces of the airplane wings have been removed.

In a preferred embodiment of the present invention depicted in FIG. 2, the safety device 10 further comprises a seatbelt latch 62 for fastening the seatbelt 60 and a seatbelt switch 64. The seatbelt switch 64 is coupled to the seatbelt latch 62 and to the warning circuit 40. The seatbelt switch 64 is actuated by at least one of a fastening and unfastening of the seatbelt 60, with the safety condition comprising the seatbelt 60 being unfastened.

An advantage of the present embodiment is that a seatbelt 60, seatbelt latch 62 and seatbelt switch 64 are common elements in existing motor vehicles. Typically, a seatbelt switch 64 is coupled by an original manufacturer to a warning circuit 40 to detect and signal to a driver that at least one of the seatbelts 60 is unfastened. This information is typically signaled by an indicator light on a display panel or an audible chime or buzzer, or a combination of methods. Although in the present embodiment the safety device 10 comprises a seatbelt latch 62 and a seatbelt switch 64, it should be understood that significant benefits may be obtained by not having a seatbelt latch 62 and a seatbelt switch 64 as long as a warning circuit 20 detects a seatbelt safety condition. For example, some automobiles have a warning circuit detecting a position of a spring for retracting a seatbelt so that a condition of a seatbelt extended or retracted comprises the safety condition.

The seatbelt switch 64 is often coupled to the warning circuit 40 via at least one insulated wire. In a direct acting configuration, the seatbelt switch 64 is open when the seatbelt 60 is unlatched and closed when the seatbelt 60 is latched. In an indirect acting configuration, the seatbelt switch 64 is closed when the seatbelt 60 is unlatched and open when the seatbelt 60 is latched. Although differing in operation, both configurations allow a determination of whether the seatbelt 60 is latched or unlatched by detecting a voltage across the seatbelt switch 64, and in particular a voltage on a wire leading to the seatbelt switch 64 in relation to ground or to a voltage on a second wire connected to the seatbelt switch 64. Although in the preferred embodiment a voltage is detected to determine if the seatbelt 60 is latched, it should be understood that significant benefits may be obtained by not detecting a voltage, as long as a determination can be made if the seatbelt 60 is latched. For example, a current through or a magnetic field around the seatbelt switch may instead be measured.

Preferably, the control circuit 50 further comprises an insulation-interrupting connector 52 for coupling to the warning circuit 40. The insulation-interrupting connector 52 allows a person to couple the control circuit 50 to the built-in warning circuit 40 without cutting existing wiring, splicing wires or soldering new connections. Instead, the insulation-interrupting connector, already coupled to the control circuit 50, is simply positioned around an existing wire of the warning circuit 40 and squeezed with a pair of pliers to create an electrical connection with the insulated wire. However, it is within the spirit and scope of the invention to not use an insulation-interrupting connector and instead use other methods of coupling the control circuit 50 to the warning circuit 40 such as traditional electrical techniques including soldering connections, so long as the control circuit 50 is coupled to the warning circuit 40.

The fuse circuit 20 further comprises an ignition fuse housing 21 for receiving an ignition fuse 22, and the control circuit 50 further comprises an electrical connector 54 dimensioned to couple to the ignition fuse housing 21 for controlling an impedance in the fuse circuit 20. For example, motor vehicles commonly feature a fuse panel 72 within easy access of a driver, such as beneath the dashboard of an automobile. The fuse panel 72 usually has fuse housings 73 coupled to fuse circuits 20 which in turn are coupled to various automotive circuits, such as lights and display indicators as well as to the motor ignition circuit 30. These circuits, including the ignition circuit 30, are typically designed so that a circuit is rendered inoperative if an open circuit is encountered across a fuse housing 73, such as when a fuse 74 is removed or has blown as a result of excessive current through the fuse 74. It should be clearly understood that the terms "ignition fuse housing" and "ignition fuse" are used to designate any fuse housing and corresponding fuse whose operation has a controlling effect on an operation of an ignition circuit, although the fuse housing and fuse may be labeled or commonly known by other names in various types of vehicles or by various manufacturers.

Although in the preferred embodiment the control circuit 50 is coupled to the fuse circuit 20 via a connector 54 dimensioned to couple to an ignition fuse housing 21, it should be understood that significant benefits may be obtained by not using a connector 54 coupled to an ignition fuse housing 21, so long as the control circuit 50 is coupled to the fuse circuit 20. For example, the control circuit 50 may be connected to the fuse circuit 40 through traditional electrical techniques such as clipping a wire leading to the ignition fuse housing 21 and connecting leads from the control circuit 50 to the clipped wires ends, thereby coupling a portion of the control circuit 50 serially with the ignition fuse housing 21.

Electrical connector 54 is dimensioned similar to the ignition fuse 22 and has two contacts 55 that independently couple to the fuse circuit 20 when the connector 54 is inserted into the ignition fuse housing 21. By controlling an impedance between the two contacts 55, the control circuit 50 may cause the ignition circuit 30 to operate normally with an impedance generally similar to an operating ignition fuse 22. Alternatively, by introducing a large impedance or an open circuit between the two contacts 55, the control circuit 50 may cause the ignition circuit 30 to behave as if the ignition fuse 22 has been removed or has blown. Generally, this results in preventing the ignition circuit 30 from starting the motor 32. However, it is within the spirit and scope of the present invention that the ignition circuit 30 not be prevented from starting the motor 32, as long as an operation of the ignition circuit is effected in conformity with a safety condition. For example, the ignition circuit 30 may operate to briefly start and stop the motor 32, or provide a desired amount of current for starting a single motor of a multiple motor device, or as another example may only provide enough current to slowly turn a crankshaft at a speed insufficient to start a motor 32, so that a user can hear the motor attempt to start as a reminder to satisfy the safety condition.

Figure 3:
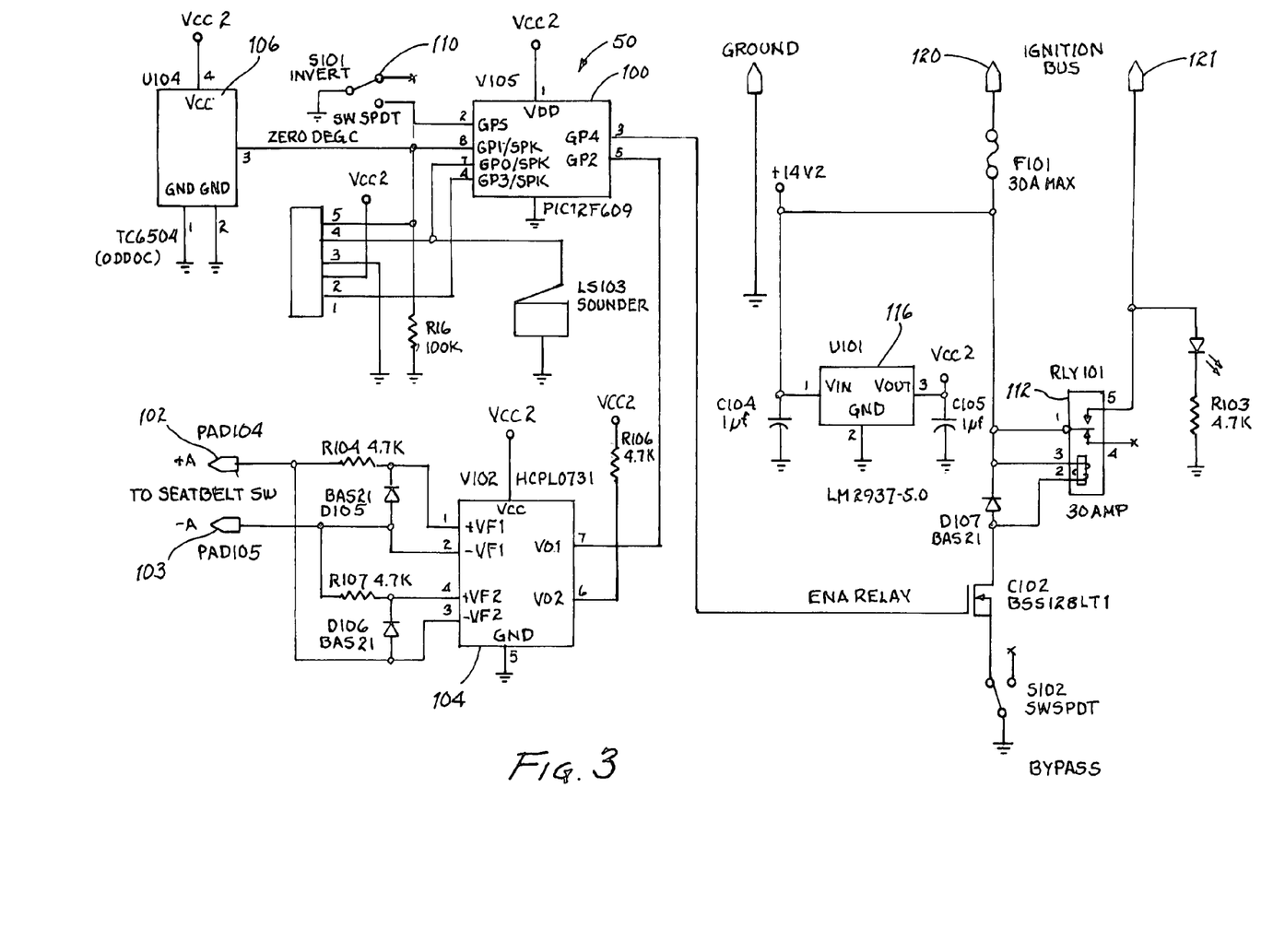
FIG. 3 is a schematic diagram of a control circuit for use with a seatbelt switch and coupled to a temperature detector, sound generator, and override mechanism in accordance with a preferred embodiment of the present invention.

FIG. 3 depicts an example of a control circuit 30 in accordance with an embodiment of the present invention. In the illustrative example of FIG. 3, the control circuit 30 has inputs 102 and 103 coupled to the insulation-interrupting connectors 52 which are further coupled to the seatbelt switch 63 (see FIG. 2). The signals from inputs 102 and 103 are acted upon by a signal comparator 104, illustrated in FIG. 3 as a commercially available split Darlington output photocoupler, which provides a signal to a commercially available microcontroller 100, in conformity with either similar or different voltage on inputs 102 and 103.

Because the signal on inputs 102 and 103 will correspond to both the seatbelt switch 63 being open or closed, and also whether the seatbelt switch 63 is direct-acting or indirect acting, polarity switch 110 is provided. Preferably, the polarity switch 110 is a manual switch that may be set according to the type of seatbelt switch 63 in use, and the operation of the microcontroller 100 is determined on a setting of the polarity switch 110.

The microcontroller 100 has an output coupled to a switching device, depicted as transistor 114, for controlling the current through the transistor 114. The current through transistor 114 operates a relay 112 which interrupts a current path between outputs 120 and 121, which are coupled to the contacts of the electrical connector 55 (see FIG. 2). When the microcontroller 100 determines that the ignition circuit 30 should be enabled, such as when the seatbelt 60 is fastened, the microcontroller 100 disables current flow through the transistor 114, allowing the relay 112 to complete a current path between outputs 120 and 121, enabling the ignition circuit 30 and allowing the vehicle to start normally. In the event a failure occurs anywhere in the circuit, it is preferred that the relay 112 defaults to a position allowing normal operation of the ignition circuit 30.

To minimize current drain on the car battery, the control circuit 50 power supply Vcc may be powered by the ignition circuit 30, using a positive voltage regulator 116. Because in an embodiment of the present invention the control circuit 50 is coupled to the fuse circuit 20 by removing an ignition fuse 22 from an ignition fuse housing 21 and inserting in its place the electrical connector 54, it is preferred that the control circuit 50 be fused, as depicted by fuse 22 in FIG. 3.

The control circuit 50 further comprises at least one fuse housing 56 connected in parallel, with at least one of the fuse housing 56 being dimensioned to couple to the ignition fuse 22 (see FIG. 2). By inserting the removed ignition fuse 22 or another fuse of appropriate capacity into a fuse housing 56, the control circuit 50 may provide the current protection designed for the original fuse circuit 20. Because fuses 74 may have varying geometries, the fuse housings 56 may be dimensioned to accept differing fuse geometries. By coupling the fuse housings 56 in parallel, a user may provide proper fuse protection by inserting an ignition fuse 22 or another fuse of appropriate capacity into any fuse housing 56 of proper dimension.

Although in the preferred embodiment, the control circuit 50 is fused, it is within the spirit and scope of the present invention that the control circuit not be fused. For example, the control circuit may have current-limiting elements, or may have no protection from high currents. It should also be understood that substantial benefits may be obtained by not having fuse housings 56 as long as a correct operation of the safety device 10 is achieved, for example, the control circuit 50 may use circuit breakers, or current-limiting components.

The ignition safety system 10 further comprises an override mechanism for selectively disabling an effect of the control circuit 50 on an operation of the ignition circuit 30. This is illustrated in FIG. 3 as bypass switch 118. When the bypass switch 118 is set to the bypass position a current path from contact 120 is established for both positions of the relay 112, ensuring normal operation of the ignition circuit 50 independent of the seatbelt condition. The bypass switch 118 may be a recessed push-button switch to make it difficult to access. Because operating the bypass switch 118 allows a person to start the vehicle 70 without wearing a seatbelt, it is preferred that any use of the bypass switch 118 be detectable. One possible method is to cover the bypass switch 118 with a tamper-proof foil so that a puncture or removal of the foil is easily detected. Although in the preferred embodiment, the control circuit 50 comprises an override mechanism, it is within the spirit and scope of the present invention that the control circuit 50 not comprise an override mechanism to allow users to avoid the operation of the ignition safety system 10.

The ignition safety system 10 may further comprise a sound generator 108 for providing an audible signal. The control circuit 50 activates the sound generator 108 in response to a change of the safety condition after the motor has started. An illustrative example is shown in FIG. 3, where the sound generator 108 is coupled to the microcontroller 100. The microprocessor 101 causes the sound generator 108 to sound if the seatbelt 60 is unfastened after being first fastened. Although the ignition safety system 10 comprises a sound generator, it is within the spirit and scope of the present invention that the ignition safety system 10 not comprise a sound generator, an instead comprise alternative methods to warn a person to fasten a seatbelt 60, such as providing a flashing light or vibrating device. It should be understood by one of ordinary skill that substantial benefits may be obtained by the ignition safety system 10 not providing a warning of a change in the safety condition, so long as an operation of the ignition circuit 30 is controlled in conformity with the safety condition.

The ignition safety system 10 may have a temperature detector 106, and the control circuit 50 disables an effect of the control circuit 50 on an operation of the ignition circuit 50 in conformity with a detection of a temperature below a threshold value. One preferred example of how the temperature detector 106 is incorporated in the present invention is shown in FIG. 3. When the ambient temperature is below a preset threshold, such as 0 degrees Celsius, the microcontroller 100 allows the ignition circuit 50 to operate normally, regardless of whether the seatbelt 60 is fastened, so that a person may start the vehicle 70 and allow it to warm up without requiring the person to remain in the vehicle 70 wearing a seatbelt 60, or so that a person may start the vehicle 70 remotely to allow it to warm up. When the ambient temperature rises above the threshold temperature, the microcontroller 100 causes the sound generator 108 to emit an audible alert until the seatbelt 60 is fastened.

However, it should be understood the circuit depicted in FIG. 3 is an illustrative example and that significant benefits may be obtained by not using the described microchip 100 and a relay 112 shown and described, as long as the control circuit 50 controls an operation of the ignition circuit 20 by acting on the fuse circuit 20 in conformity with a safety condition. For example, the control circuit 50 may comprise analog or mechanical components, or may comprise software operating on a computer. It should also be clearly understood that one of ordinary skill in the art may modify the circuit depicted in FIG. 3, such as by removing the temperature detector 106 or sound generator 108, or by removing bypass switch 118 or repositioning bypass switch 118 to directly connect contacts 120 and 121 as another example, without departing from the spirit and scope of the present invention.

The microcontroller 100 is programmed to detect if either the seatbelt 60 is fastened or the temperature is below the preset threshold. If so, an output is generated to enable the ignition circuit 40 by allowing a current through transistor 114, otherwise the output disables the ignition circuit 40. If the car has started, the temperature is above the threshold and the seatbelt 60 is unfastened, a signal is generated to activate the sound generator 108. When a seatbelt fastening is detected, the sound generator (if activated) is deactivated, and the ignition circuit 40 is enabled.

The safety device 10 may further have a control circuit housing 51. The housing 51 is relatively small and easily overlooked so that an operator may not recognize a safety device 10 is installed. It is preferred that the housing be adapted to fasten under a dashboard near the ignition fuse housing 21, such as with adhesives, magnetism, hook and loop material, or fasteners such as screws, as examples. The housing 51 may define apertures in communication with the at least one fuse housing 56 of the control circuit 50 so that a fuse may be manually inserted or removed without opening the housing 51.

Figure 4:
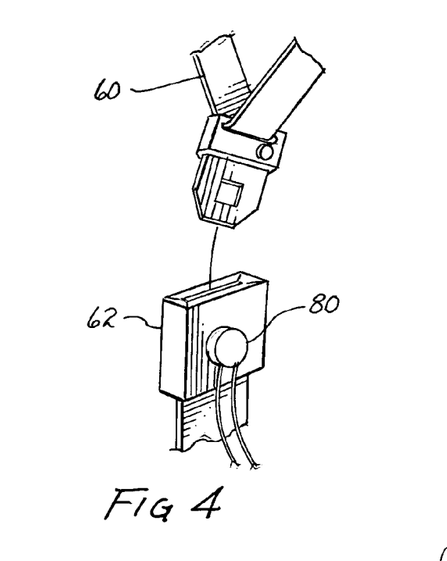
FIG. 4 is a perspective illustration depicting a proximity detector attached to a seatbelt latch and tongue in accordance with a preferred embodiment of the present invention.

An alternate embodiment of the present invention is depicted in FIG. 4. In this embodiment the safety device 10 further comprises a seatbelt latch 62 for fastening the seatbelt 60 and a proximity detector 80 for detecting the seatbelt 60 proximate the seatbelt latch 62. The proximity detector 80 is coupled to the warning circuit 40, and the safety condition comprises the seatbelt 60 being unfastened. The proximity detector 80 is preferably be a magnetically activated Hall-effect or reed switch, or any other device capable of detecting when the seatbelt 60 is near the seatbelt latch 62.

Figure 5:
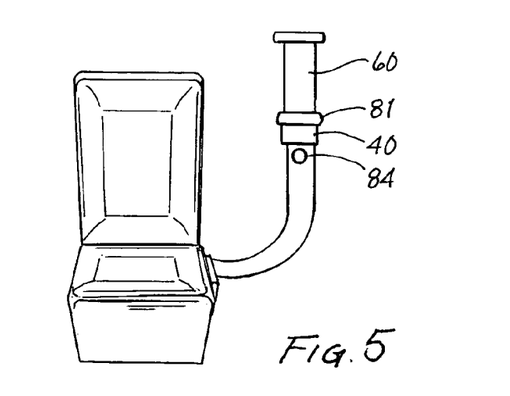
FIG. 5 is a perspective illustration depicting a seatbelt orientation detector, warning circuit, and transmitter fastened to a seatbelt in a non-use orientation in accordance with a preferred embodiment of the present invention.
Figure 6:
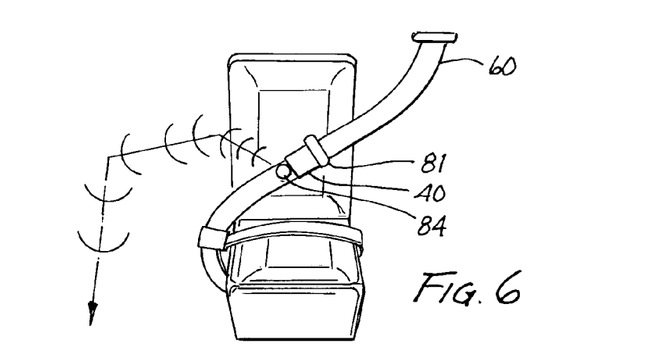
FIG. 6 is a perspective illustration depicting the seatbelt orientation detector, warning circuit, and transmitter of FIG. 5 in an in-use orientation and transmitting a signal in accordance with a preferred embodiment of the present invention.
Figure 7:
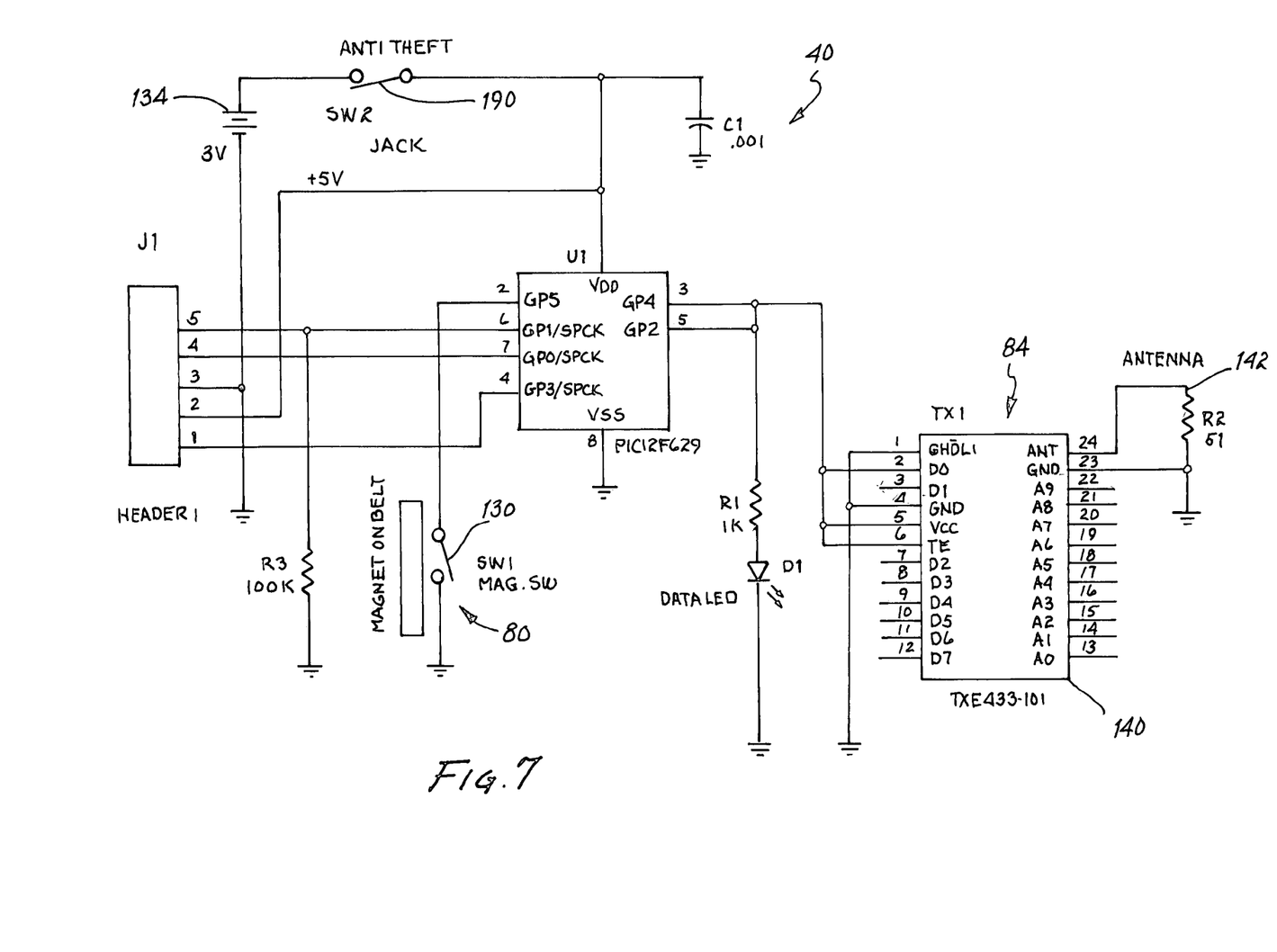
FIG. 7 is a schematic diagram of a proximity detector, warning circuit, and transmitter in accordance with a preferred embodiment of the present invention.

FIG. 5 depicts an alternate embodiment of the present invention. In this embodiment, the safety device 10 further comprises a detector 81 for detecting at least one of an orientation of the seatbelt and a position of the seatbelt 60, the detector 81 is coupled to the warning circuit 40, and the safety condition comprises the seatbelt 60 not in a protective position. Typically, a seatbelt 60 in use is extended across a wearer's chest, lap, or a combination of chest and lap, as illustrated in FIG. 7, while a seatbelt in a stored position not in use is typically retracted and positioned to a side of an occupant, as illustrated in FIG. 5. Further, a seatbelt 60 crossing a wearer's chest as in FIG. 6 typically forms an angle from the vertical as the seatbelt 60 spans from one shoulder to the opposite hip, while a seatbelt designed to cross an occupant's chest tends to hang vertically when not in use as in FIG. 5. Detection of either a non-vertical orientation, or a position removed from a non-use position, indicates that a seatbelt 60 is not in use by an occupant.

The detector 81 is fastened to a seatbelt 60 and can detect at least one of a position of the seatbelt 60 and an orientation of the seatbelt 60. Position may be detected in relation to reference points, for example, on each side of a seat. As another example, detector 81 may detect position by detecting an extension of the seatbelt 60 from a non-use position, such as by measuring the travel of a line connecting the seatbelt 60 to a seatbelt anchor point, or by optically detecting the travel of a seatbelt past a sensor. Orientation may be detected by a ball switch or mercury switch, for example, opening or closing a circuit when the seatbelt 60 is removed from vertical.

Figure 6A:
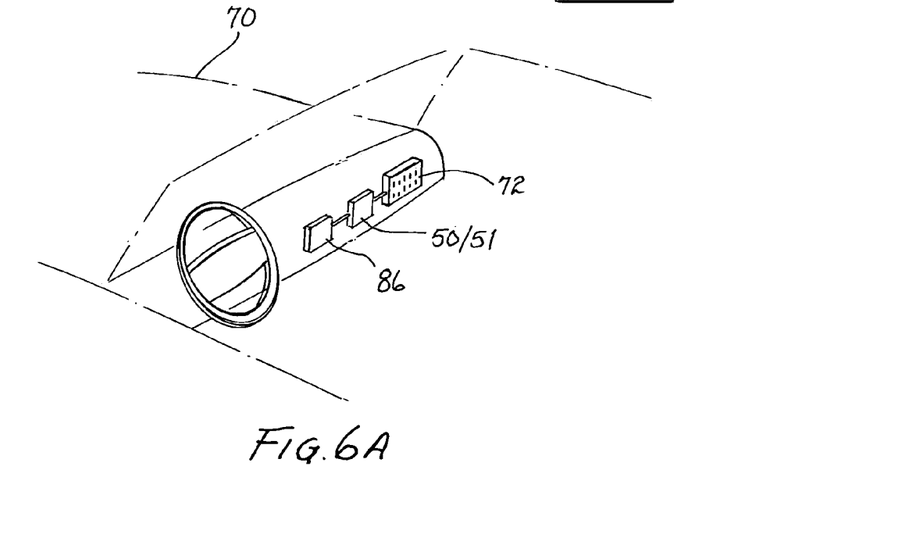
FIG. 6A is a perspective illustration of a receiver, control circuit, and fuse panel beneath an automobile dashboard in accordance with a preferred embodiment of the present invention.

In accordance with another embodiment of the present invention, the safety device 10 further comprises a transmitter 84 coupled to the warning circuit 40 and a receiver 86 coupled to the control circuit 50 for wirelessly coupling the warning circuit 40 to the control circuit 50. FIGS. 5, 6 and 6A illustrate the use of a transmitter 84 and a receiver 86 in conjunction with a position or orientation detector 81 attached to a seatbelt 60. Coupling the detector 81 of FIGS. 6 and 7 to the control circuit 50 of FIG. 7A with conventional wiring would require long lengths of wire alternately under tension or slack as the seatbelt 60 is extended or retracted. By coupling the transmitter 84 to the warning circuit 40, which is coupled to the detector 81 located on the seatbelt 60 in FIGS. 6 and 7, and coupling the receiver 86 to the control circuit 50, preferably in proximity to or within the housing 51 located under the dashboard, the warning circuit 40 may be coupled to the control circuit 50 wirelessly.

Upon detection of a seatbelt 60 being used, the warning circuit 40 causes the transmitter 84 to send at least one signal of sufficient duration to substantially ensure detection by the receiver 86. It is desirable that the transmitter 84 emit three sequential one-second signals to ensure proper reception by the receiver 86, although substantial benefit may be obtained with a differing number of signals or signals of different duration, or both. It is also desirable that the receiver 86 be continually operable to detect a signal even before a driver has turned the vehicle key from the vehicle off position. Continuous operation of the receiver 86 may be accomplished by, for example, providing power by battery or by coupling to an appropriate fuse housing with a fuse tap. Because the control circuit 50 may receive power through the ignition circuit fuse housing, the control circuit may not be operable if the signal is received before a user turns the key from the vehicle off position. It is therefore desirable that the receiver 86 maintain a state for notifying the control circuit 50 of receipt of the signal for sufficient time to allow a driver to fasten a seatbelt 60, insert a key, and turn the key to start the car. The notifying state of the receiver 86 may preferably last approximately one minute, although benefit may be obtained from shorter or longer periods.

Although the embodiment depicted in FIGS. 6 and 6A has a transmitter 84 located on a seatbelt 60 in conjunction with a position or orientation detector 81, it should be understood that significant benefit may be obtained when the transmitter 84 is not used in conjunction with a position or orientation detector 81. For example, the transmitter 84 and receiver 86 may be used in place of the wiring depicted in FIG. 2 coupling the seatbelt switch 64 to the control circuit 50. As another example, the transmitter 84 and receiver 86 may be used in conjunction with a seatbelt proximity detector 80 of FIG. 4 located near a seatbelt latch 62.

Figure 8:
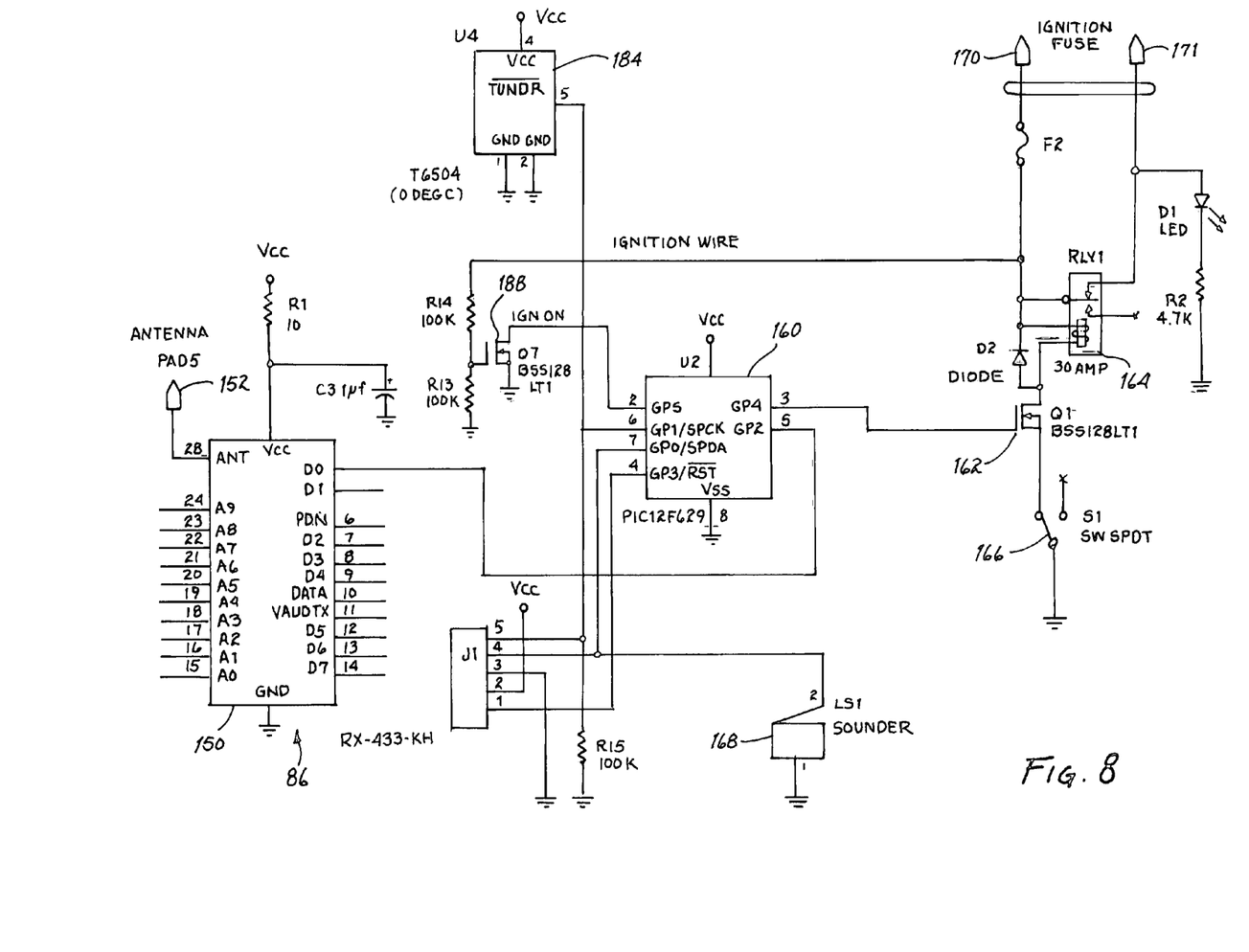
FIG. 8 is a schematic diagram of a receiver and control circuit in accordance with a preferred embodiment of the present invention.
Figure 8A:
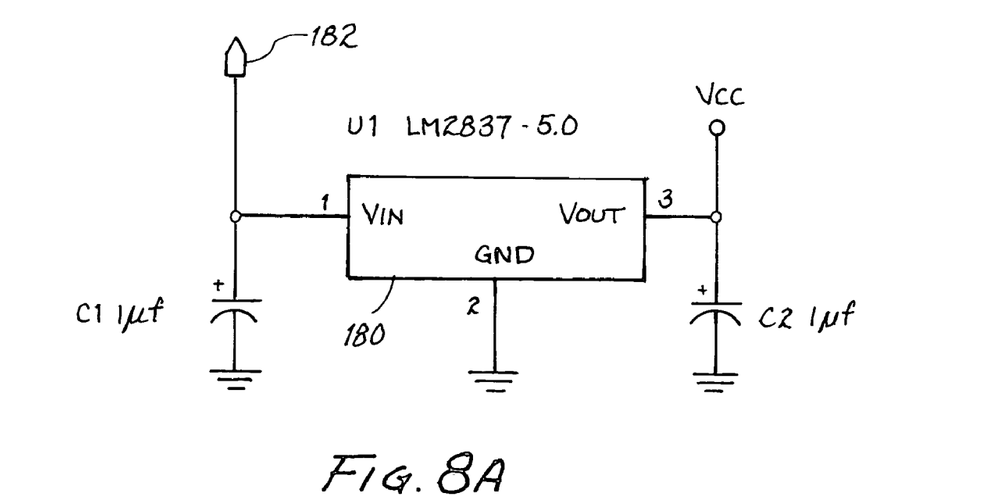
FIG. 8A is a schematic diagram of a power supply for the receiver and control circuit of FIG. 8 in accordance with a preferred embodiment of the present invention.

FIGS. 7, 8 and 8A provide an illustration of a preferred embodiment of the present invention. FIG. 7 depicts a circuit diagram illustrating the proximity detector 80 of FIG. 4 as a magnetic switch 130. The warning circuit 40 comprises a microcontroller 132 that is coupled to the transmitter 84. A battery 134 powers the microcontroller 132 which detects when the magnetic switch 130 is closed. The magnet 136 is fastened just above the seatbelt tongue, and the switch 130 is fastened to the seatbelt latch 62. The microcontroller 132 is coupled to the transmitter 114, which comprises transmitter controller 140 and transmitter antenna 142.

FIG. 8 depicts a circuit diagram illustrating a preferred control circuit 50 and the receiver 86 in accordance with the current embodiment of the present invention. The receiver 86 comprises a receiver antenna 152 coupled to the receiver controller 150. Upon detecting a signal from a transmitter 84, the receiver controller 150 provides a signal to the control circuit 50 indicating that the seatbelt 60 has been fastened.

The microcontroller 160 has an output coupled to a switching device, depicted as transistor 162, for controlling the current through the transistor 162. The current through transistor 162 operates a relay 164 which interrupts a current path between outputs 170 and 171, which are coupled to the contacts of the electrical connector 55 (see FIG. 2). When the microcontroller 160 determines that the ignition circuit 30 should be enabled, such as when the seatbelt 60 is fastened, the microcontroller 160 disables current flow through the transistor 162, allowing the relay 164 to complete a current path between outputs 170 and 171, enabling the ignition circuit 30 and allowing the vehicle to start normally. In the event a failure occurs anywhere in the circuit, it is preferred that the relay 164 defaults to a position allowing normal operation of the ignition circuit 30.

Because in an embodiment of the present invention the an ignition fuse 22 is removed from an ignition fuse housing 21 and replaced by the electrical connector 54, it is preferred that the control circuit 50 be fused, as depicted by fuse 22 in FIG. 8.

In a preferred embodiment of the present invention, the control circuit 50 further comprises at least one fuse housing 56 connected in parallel, with at least one of the fuse housing 56 being dimensioned to couple to the ignition fuse 22 (see FIG. 2). By inserting the removed ignition fuse 22 or another fuse of appropriate capacity into a fuse housing 56, the control circuit 50 may provide the current protection designed for the original fuse circuit 20. Because fuses 74 may have varying geometries, the fuse housings 56 are dimensioned to accept differing fuse geometries. By coupling the fuse housings 56 in parallel, a user may provide proper fuse protection by inserting an ignition fuse 22 or another fuse of appropriate capacity into any fuse housing 56 of proper dimension.

Although in the preferred embodiment, the control circuit 50 is fused, it is within the spirit and scope of the present invention that the control circuit not be fused. For example, the control circuit may have current-limiting elements, or may have no protection from high currents. It should also be understood that substantial benefit may be obtained by not having fuse housings 56 as long as a correct operation of the safety device 10 is achieved, for example, the control circuit 50 may use circuit breakers, or current-limiting components.

The current embodiment of ignition safety system 10 shown in FIG. 8 further comprises an override mechanism for selectively disabling an effect of the control circuit 50 on an operation of the ignition circuit 30. This is illustrated in FIG. 8 as bypass switch 118. When the bypass switch 118 is set to the bypass position a current path from contact 120 is established for both positions of the relay 112, ensuring normal operation of the ignition circuit 50 independent of the seatbelt condition. The bypass switch 166 is a recessed push-button switch to make it difficult to access. Because operating the bypass switch 166 allows a person to start the vehicle 70 without wearing a seatbelt, it is preferred that any use of the bypass switch 166 be detectable. One possible method is to cover the bypass switch 166 with a tamper-proof foil so that a puncture or removal of the foil is easily detected. Although in the present embodiment, the control circuit 50 comprises an override mechanism, it is within the spirit and scope of the present invention that the control circuit 50 not comprise an override mechanism to allow users to avoid the operation of the ignition safety system 10.

The ignition safety system 10 may further have a sound generator 168 for providing an audible signal. The control circuit 50 activates the sound generator 168 in response to a change of the safety condition after the motor 32 has started. An illustrative example is shown in FIG. 8, where the sound generator 168 is coupled to the microcontroller 160. The microprocessor 160 causes the sound generator 168 to sound if the seatbelt 60 is unfastened after the motor 32 has started. Transistor 188, driven by the current flow through a voltage divider from the fuse circuit 20 through contact 170, is coupled to the microprocessor 160 to reflect the operation of the ignition circuit 30. Although the ignition safety system 10 comprises a sound generator 168, it is within the spirit and scope of the present invention that the ignition safety system 10 not comprise a sound generator, an instead comprise alternative methods to warn a person to fasten a seatbelt 60, such as providing a flashing light or vibrating device. It should be understood by one of ordinary skill that substantial benefits may be obtained by the ignition safety system 10 not providing a warning of a change in the safety condition, so long as an operation of the ignition circuit 30 is controlled in conformity with the safety condition.

The ignition safety system 10 may further comprise a temperature detector 184, and the control circuit 50 disables an effect of the control circuit 50 on an operation of the ignition circuit 50 in conformity with a detection of a temperature below a threshold value. One example of how the temperature detector 184 is incorporated in the present invention is shown in FIG. 8. When the ambient temperature is below a preset threshold, such as 0 degrees Celsius, the microcontroller 160 allows the ignition circuit 50 to operate normally, regardless of whether the seatbelt 60 is fastened, so that a person may start the vehicle 70 and allow it to warm up without requiring the person to remain in the vehicle 70 wearing a seatbelt 60, or so that a person may start the vehicle 70 remotely to allow it to warm up. When the ambient temperature rises above the threshold temperature, the microcontroller 100 causes the sound generator 168 to emit an audible alert until the seatbelt 60 is fastened.

However, it should be clearly understood the circuit depicted in FIG. 8 is an illustrative example and that significant benefit may be obtained by not using the described microchip 160 and a relay 164 shown and described, as long as the control circuit 50 controls an operation of the ignition circuit 20 by acting on the fuse circuit 20 in conformity with a safety condition. For example, the control circuit 50 may comprise analog or mechanical components, or may comprise software operating on a computer. It should also be clearly understood that one of ordinary skill in the art may modify the circuit depicted in FIG. 3, such as by removing the temperature detector 184 or sound generator 168, or by removing bypass switch 166 or repositioning bypass switch 166 to directly connect contacts 170 and 171 as another example, without departing from the spirit and scope of the present invention.

The microcontroller 160 is programmed to detect if either the seatbelt 60 is fastened or the temperature is below the preset threshold. If so, an output is generated to enable the ignition circuit 40 by allowing a current through transistor 162, otherwise the output disables the ignition circuit 40. If the car has started, the temperature is above the threshold and the seatbelt 60 is unfastened, a signal is generated to activate the sound generator 168. When a seatbelt fastening is detected, the sound generator 168 (if activated) is deactivated, and the ignition circuit 40 is enabled.

In order to ensure that the receiver 86 can detect a signal from the transmitter 84 indicating a seatbelt has been fastened prior to a user attempting to start the motor, the receiver 84 maintains a continual power supply Vcc even when the motor is off. FIG. 9A illustrates a preferred method of supplying power to the receiver 86 and control circuit 50 of FIG. 9 using a positive voltage regulator 180. For ease of installation, it is preferred that input 182 to the voltage regulator 180 is coupled to a fuse circuit that receives continual power at the fuse panel 72 (see FIGS. 2 and 6A) with a fuse tap (not shown). However, it should be clearly understood that alternate methods of providing continual power to the receiver 86, such as providing a battery, or connecting directly to the battery of the vehicle, or by otherwise connecting to vehicle wiring that receive continual power, are within the spirit and scope of the present invention. Further, although the embodiment of the present invention depicted in FIG. 9 shows the receiver 86 and control circuit 50 both use power supply Vcc, significant benefit may be obtained by having the receiver 86 and control circuit 50 have independent power supplies, with the receiver 86 having a continuous supply and the control circuit 50 having a power supply that is not continuous, such as illustrated in FIG. 3.

In accordance with another embodiment of the present invention the ignition safety system 10 further comprises a removable anti-theft connector 190 so that the ignition circuit 30 is disabled when the anti-theft connector 190 is removed. The anti-theft connector 190 may be connected as shown in FIG. 7 in series with the power supply for the warning circuit 40 so that removal of the anti-theft connector 190 will prevent the warning circuit 40 from communicating a safety condition to the control circuit 50 to enable the ignition circuit 30. Although the removable anti-theft connector 190 is connected in the warning circuit 40 as shown in FIG. 7, it should be clearly understood that substantial benefit may be obtained by connecting the removable anti-theft connector at any other location in the present invention, so long as removal of the anti-theft connector 190 interrupts the operation of the ignition circuit. The anti-theft connector 190 is a removable device similar to a headphone jack that completes a current path necessary for starting the motor 32 when in place, however, the anti-theft connector 190 may be a smart card such as found in cellular phones, which can be individually encoded to prevent the operation of the ignition circuit unless the proper card is installed, or any other device suitable for interrupting the operation of the ignition safety system 10 when removed.

In accordance with another embodiment of the present invention, an ignition safety system comprises, in combination: seatbelt indication means for indicating a seatbelt condition; an electrical connector 54 dimensioned to couple to a fuse housing 21 of an ignition circuit 30; and a switch 112 coupled to the electrical connector 54 and to the seatbelt indication means for enabling and disabling the ignition circuit 30 in conformity with the seatbelt condition. The seatbelt indication means may be, for example, a proximity detector 80 for detecting the proximity of a seatbelt to a seatbelt latch, a detector 81 for detecting at least one of a proximity and a position of a seatbelt 60, or a seatbelt switch 64. Other examples of the seatbelt indication means include devices to detect if a seatbelt has been extended or retracted such as optical detectors and mechanical devices for detecting if a seatbelt 60 has been removed from a spring-biased retracting coil housing, such as by detecting the tension on a spring or line coupled to the seatbelt 60. The switch 112 preferably is a relay, although it may be, for example, a transistor, a mechanical switch, or other electrical switching mechanisms.

Although preferably the seatbelt indication means is a electrical signal generated by a detector or seatbelt switch and the switch is preferably a relay, it should be clearly understood that substantial benefit may be obtained by having the safety system comprise mechanical components. As an example, it is within the spirit and scope of the present invention that the switch 112 may be a normally-off spring-biased toggle switch, and one end of a string may be fastened to a seatbelt 60 and the other end fastened to the toggle switch 130, so that when the seatbelt 60 is extended the string actuates the toggle switch 130 against the spring bias to allow the ignition circuit 30 to operate, releasing the seatbelt 60 causes the spring bias to close the toggle switch and prevent the ignition circuit 30 from operating.

METHOD OF OPERATION

In accordance with a preferred embodiment of the present invention, a safety method is disclosed. The method comprises the steps of providing a fuse circuit 20 for disabling an ignition circuit 30 of a motor 32 at a predetermined electrical current, providing a warning circuit 40 for indicating a safety condition, and providing a control circuit 50. The method further comprises coupling the control circuit 50 to the warning circuit 40, coupling the control circuit 50 to the fuse circuit 20, detecting the safety condition, and controlling an operation of the ignition circuit 30.

Preferably, the safety method further comprises the steps of providing a vehicle 70 powered by the motor 32 and providing a seatbelt 60, with the safety condition comprising the seatbelt 60 being fastened. However, it should be clearly understood that substantial benefit may be obtained by not having the motor 32 power a vehicle 70 or the safety condition comprise a seatbelt 60 being fastened, as long as an operation of the ignition circuit 30 is controlled in response to the safety condition. For example, the method may instead include the steps of providing a riding lawnmower and providing a pressure sensor in a seat of the lawnmower, with the safety condition being that a user of the mower is seated.

The safety method preferably further comprises providing a seatbelt switch 64, the seatbelt switch 64 being actuated by at least one of a fastening and an unfastening of the seatbelt, and the warning circuit 40 being coupled to the seatbelt switch 64. Typically, automobiles featuring seatbelt warning indicators have a seatbelt switch 64 and a warning circuit 40 for detecting the seatbelt switch 64 already installed as original equipment by the automobile manufacturer. However, it is within the spirit and scope of the present invention that the seatbelt switch 64 and warning circuit 40 not come as original equipment, but instead are provided as aftermarket additions.

The safety method preferably further comprises providing an insulation-interrupting connector 52 coupled to the control circuit 50, and the coupling of the control circuit 50 to the warning circuit 40 is performed using the insulation-interrupting connector 52. This preferred method of coupling the control circuit 50 to the warning circuit 40 provides the benefit of ease of installation for a layperson and also the benefit of a minimally intrusive and reversible connection. Although in the preferred embodiment of the present invention an insulation-interrupting connector 52 is used, it should be clearly understood that substantial benefit may be obtained by any method that couples the control circuit 50 to the warning circuit 40. For example, a wire of the warning circuit 40 may be cut, the resulting ends stripped of insulation and connected to a wire of the control circuit 50 using a WIRE-CUT® or any other type of twist-on wire connector.

In accordance with another embodiment or the present invention, the safety method comprises providing a detector 81 for detecting at least one of a position and an orientation of the seatbelt 60, with the detector 61 being coupled to the warning circuit 40. Detecting that a seatbelt 60 has changed position or an orientation from a non-use or stored position may indicate that the seatbelt 60 is properly in use. For example, a detector 61 having a mercury switch or a ball switch attached to a chest strap of a seatbelt 60 may indicate either when the seatbelt is in a substantially vertical orientation, indicating non-use, or in a substantially angled orientation, indicating that the seatbelt is in use. As another example, a detector capable of detecting a position of a seatbelt 60 may be attached to the seatbelt and monitor wireless signals indicating proximity of the detector to one or more signal sources, indicating when the seatbelt is in a position of non-use or of use.

In accordance with another embodiment of the present invention, the safety method comprises the steps of providing a transmitter 84 coupled to the warning circuit 40 and providing a receiver 86 coupled to the control circuit 50 for wirelessly coupling the warning circuit 40 to the control circuit 50. For example, a transmitter 84 may be attached to a seatbelt 60 near a seatbelt detector 81 and powered by battery, to transmit radiofrequency information from the detector 81, and a corresponding receiver 86 may be located under a dashboard near a fuse panel 72. One benefit of the present embodiment is the reduction of lengthy and potentially entangling wiring that may be needed to couple the warning circuit 40 to the control circuit 50. Another benefit arises from the typically small profile of wireless components making the use of an safety method likely to be unnoticed by a casual observer.

In accordance with another embodiment of the present invention, the safety method comprises the steps of: providing an ignition fuse housing 21 coupled to the fuse circuit 20; providing an ignition fuse 22 coupled to the ignition fuse housing 21; and providing an electrical connector 54 coupled to the control circuit 50. The method further comprises the electrical connector 54 being dimensioned to couple to the ignition fuse housing 21, and coupling the control circuit 50 to said fuse circuit 20 comprises removing the ignition fuse 22 from the ignition fuse housing 21 and coupling the electrical connector 54 to the ignition fuse housing 21.

Preferably, the safety method of the present embodiment further comprises the step of providing at least one fuse housing 56 coupled to the electrical connector 54, and coupling the control circuit 50 to the fuse circuit 20 further comprises the step of coupling the ignition fuse 22 to at least one of the at least one fuse housing 56. Providing at least one fuse housing 56, which may be dimensioned to correspond to different standard automotive fuse geometries, coupled to the electrical connector 54 provides a benefit of allowing the ignition fuse 22 removed from the ignition fuse housing 21 to continue to be used as a fuse element. However, it should be clearly understood that substantial benefit may be obtained by not providing at least one fuse housing 56 coupled to the electrical connector 54, and instead using another protective mechanism such as a circuit breaker or current-limiting elements coupled to the electrical connector 54, for example. In addition, it is within the spirit and scope of the present invention that the electrical connector 54 not be coupled to any protective elements such as a fuse or circuit breaker, so long as the described operation results under normal conditions.

What is claimed is:

1. An ignition safety system, comprising, in combination:
    a fuse circuit;
    an ignition circuit coupled to said fuse circuit for starting a motor;
    a warning circuit for indicating a safety condition; and
    a control circuit coupled to both said warning circuit and said fuse circuit for controlling an operation of said ignition circuit.

2. The system of claim 1, further comprising a seatbelt, said safety condition comprising a condition of said seatbelt.

3. The system of claim 2, further comprising a vehicle, said motor providing power for said vehicle.

4. The system of claim 2, further comprising:
    a seatbelt latch for fastening said seatbelt; and
    a seatbelt switch, said seatbelt switch coupled to said seatbelt latch and to said warning circuit, said seatbelt switch actuated by a fastening and unfastening of said seatbelt, said safety condition comprising said seatbelt being unfastened.

5. The system of claim 4, said control circuit further comprising an insulation-interrupting connector for coupling to said warning circuit.

6. The system of claim 2, further comprising:
    a seatbelt latch for fastening said seatbelt; and
    a proximity detector for detecting said seatbelt proximate said seatbelt latch, said proximity detector coupled to said warning circuit, said safety condition comprising said seatbelt being unfastened.

7. The system of claim 2, further comprising a detector for detecting at least one of an orientation of said seatbelt and a position of said seatbelt, said detector being coupled to said warning circuit, said safety condition comprising-said seatbelt not in a protective position.

8. The system of claim 2, further comprising a transmitter coupled to said warning circuit and a receiver coupled to said control circuit for wirelessly coupling said warning circuit to said control circuit.

9. The system of claim 2, further comprising an override mechanism for selectively disabling an effect of said control circuit on an operation of said ignition circuit.

10. The system of claim 1, said fuse circuit further comprising an ignition fuse housing for receiving an ignition fuse, said control circuit further comprising an electrical connector dimensioned to couple to said ignition fuse housing for controlling an impedance in said fuse circuit.

11. The system of claim 10, said control circuit further comprising at least one fuse housing connected in parallel, at least one of said at least one fuse housing being dimensioned to couple to said ignition fuse.

12. The system of claim 1, further comprising a sound generator for providing an audible signal, said control circuit activates said sound generator in response to a change of said safety condition after said motor has started.

13. The system of claim 2, further comprising:
a temperature detector, said control circuit disabling an effect of said control circuit on an operation of said ignition circuit in conformity with a detection of a temperature below a threshold value.

14. The system of claim 1, further comprising a removable anti-theft connector, said ignition circuit is disabled when said anti-theft connector is removed.

15. An ignition safety system, comprising, in combination:
a fuse circuit comprising a fuse housing;
an ignition circuit for starting a motor of a vehicle, said ignition circuit being coupled to said fuse circuit;
a warning circuit for indicating a seatbelt condition; and
a control circuit comprising an electrical connector, said electrical connector being dimensioned to engage said fuse housing for coupling said control circuit to said fuse circuit, said control circuit being further coupled to said warning circuit, for controlling an operation of said ignition circuit in conformity with said seatbelt condition.

16. The system of claim 15, further comprising a sound generator for providing an audible signal, said control circuit activates said sound generator in response to a change of said safety condition after said motor has started.

17. The system of claim 15, further comprising:
a temperature detector, said control circuit disabling an effect of said control circuit on an operation of said ignition circuit in conformity with a detection of a temperature below a threshold value.

18. The system of claim 15, further comprising a removable anti-theft connector, said ignition circuit is disabled when said anti-theft connector is removed.

19. An ignition safety system, comprising, in combination:
seatbelt indication means for indicating a seatbelt condition;
an electrical connector dimensioned to couple to a fuse housing of an ignition circuit; and
a switch coupled to said electrical connector and to said seatbelt indication means for enabling and disabling said ignition circuit in conformity with said seatbelt condition.

20. A safety method comprising the steps of:
providing a fuse circuit for disabling an ignition circuit of a motor at a predetermined electrical current;
providing a warning circuit for indicating a safety condition;
providing a control circuit;
coupling said control circuit to said warning circuit;
coupling said control circuit to said fuse circuit;
detecting said safety condition; and
controlling an operation of said ignition circuit.

21. The method of claim 20, further comprising the steps of:
providing a vehicle, said motor powers said vehicle; and
providing a seatbelt, said safety condition comprises said seatbelt being fastened.

22. The method of claim 21, further comprising the step of providing a seatbelt switch, said seatbelt switch being actuated by at least one of a fastening and an unfastening of said seatbelt, said warning circuit being coupled to said seatbelt switch.

23. The method of claim 22, further comprising the step of providing an insulation-interrupting connector coupled to said control circuit, said coupling said control circuit to said warning circuit is performed using said insulation-interrupting connector.

24. The method of claim 21, further comprising the step of providing a detector for detecting at least one of a position and an orientation of said seatbelt, said detector being coupled to said warning circuit.

25. The method of claim 20, further comprising the steps of:
providing a transmitter coupled to said warning circuit; and
providing a receiver coupled to said control circuit for wirelessly coupling said warning circuit to said control circuit.

26. The method of claim 20, further comprising the steps of:
providing an ignition fuse housing coupled to said fuse circuit;
providing an ignition fuse coupled to said ignition fuse housing; and
providing an electrical connector coupled to said control circuit, said electrical connector being dimensioned to couple to said ignition fuse housing, said coupling said control circuit to said fuse circuit comprises the steps of removing said ignition fuse from said ignition fuse housing and coupling said electrical connector to said ignition fuse housing.

27. The method of claim 26, further comprising the step of providing at least one fuse housing coupled to said electrical connector, said coupling said control circuit to said fuse circuit further comprises the step of coupling said ignition fuse to at least one of said at least one fuse housing.

* * * * *